UNITED STATES PATENT OFFICE.

HENRY O. FREEMAN, OF SHERBURNE, NEW YORK, ASSIGNOR TO HENRY D. GARDNER, OF NORTH MARSHFIELD, MASSACHUSETTS.

IMPROVEMENT IN PROCESSES FOR MAKING CHEESE.

Specification forming part of Letters Patent No. 136,051, dated February 18, 1873.

*To all whom it may concern:*

Be it known that I, H. O. FREEMAN, of Sherburne, in the county of Chenango and State of New York, have made an invention of a new and useful Improvement in the Art of Manufacturing Cheese; and that the following is a full, clear, and exact description and specification of the same.

The object of my invention is to produce cheese of excellent quality from materials of low cost.

The materials which I use for the purpose are skim-milk and fat, and my invention is based upon the discovery that when fat is mixed with skim-milk by the aid of heat, and the emulsion so produced is treated with rennet, curd is obtained which has the same richness as curd produced from unskimmed milk, or from a mixture of such milk and cream.

The fats which I have used with success, are tallow, lard, and butter of a low grade, which, in the vicinity of cities is of less value than cream, or of butter of the best quality; and the mode in which I have practiced my invention with success is as follows:

The skimmed milk is placed in the cheese-vat in common use and heated to 98° or 100° Fahrenheit. The fat to be added is melted in a separate vessel and then mixed with the milk at the above heat, so as to form an emulsion. The emulsion is then constantly stirred while the heat is reduced to about 84°, at which temperature the rennet is added. The rennet may, however, be added with the melted fat, or at any period during the cooling; but I prefer to add it at about the above-stated temperature, 84°; and it is important that the coagulation should be rapid while the fat is thoroughly intermixed with the milk. After the curd is produced the separation of it from the whey, and the other operations required to produce cheese, are the same as the corresponding operations practiced in manufacturing cheese in the ordinary way.

In making cheese on the above-described plan a change appears to be effected in the fat used by the action of the rennet, so that it combines with the caseine of the milk in the same manner as the unseparated fat of unskimmed milk, and consequently the cheese obtained by treating the mixture of skim-milk and fat by rennet is a different article from skim-milk cheese adulterated by mixing butter with it after the separation of the curds and whey; for whereas, in the former article the fat appears to be intimately combined with the caseine, in the latter case there is merely an imperfect mechanical mixture of the two.

Skim-milk, as is well known, is a product of small value in the districts where butter is largely made, because of the low value of the cheese which has thus far been produced from it. On the other hand, tallow and lard are of much less value than good butter, and butter of a low grade can frequently be purchased for a less price than the value of cream, particularly in cities, so that, if these fats are employed, rich cheese can be manufactured at a lower cost than from unskimmed milk, assuming that a quantity of fat is used equal in weight to the butter that can be made out of the cream removed from the milk by skimming. But there appears to be a still greater gain due to my system of manufacture arising from the fact that when unskimmed milk is treated with rennet, a large amount of the fat matter (which would make butter) passes off with the whey; whereas, when the emulsion of skim-milk and butter is treated with rennet, practically the whole of the butter combines with the curds produced; the practical result of my experiments being, that if the milk be skimmed and the cream made into butter, and only half of this butter be made into an emulsion with the skim-milk and manufactured into cheese upon my system, the cheese so produced is fully as rich as that which can be obtained from an equal quantity of unskimmed milk, so that practically half the butter of the milk is saved.

The proportionate quantities of skim-milk and fat which I have used with success, are fifteen pounds of fat for every one thousand pounds of skim-milk; but these proportions may be varied as found expedient. I also find it expedient to add to the milk three ounces of saltpeter for every one thousand pounds of skim-milk.

I am aware that cheese has been made from mixtures of milk and cream; but in such case the fat of the cream has not been separated from the other constituents of cream before it is operated on by the rennet; while by my invention fat uncombined with the constituents of cream is made to enter into the composition of the curds while the latter are in a nascent state.

I claim as my invention—

The improvement in the art of manufacturing cheese by treating an emulsion of skim-milk and fat with rennet, substantially as before set forth.

HENRY O. FREEMAN.

Witnesses:
 C. S. SYMONDS,
 D. J. FLOYD, Jr.